(12) United States Patent
Ito

(10) Patent No.: US 8,098,009 B2
(45) Date of Patent: Jan. 17, 2012

(54) ELECTRO-OPTICAL DEVICE AND ELECTRONIC APPARATUS FOR A LIQUID CRYSTAL PANEL

(75) Inventor: Tomoyuki Ito, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 296 days.

(21) Appl. No.: 12/314,003

(22) Filed: Dec. 2, 2008

(65) Prior Publication Data
US 2009/0091256 A1    Apr. 9, 2009

Related U.S. Application Data

(62) Division of application No. 11/179,657, filed on Jul. 13, 2005, now abandoned.

(30) Foreign Application Priority Data

Aug. 17, 2004    (JP) .................................. 2004-237070

(51) Int. Cl.
H01J 1/62    (2006.01)
(52) U.S. Cl. ........................................ 313/506; 313/504
(58) Field of Classification Search ........... 313/498–512
See application file for complete search history.

(56) References Cited

U.S. PATENT DOCUMENTS

| | | | |
|---|---|---|---|
| 4,678,285 A | 7/1987 | Ohta et al. | |
| 5,883,684 A | 3/1999 | Millikan et al. | |
| 5,909,081 A * | 6/1999 | Eida et al. | 313/504 |
| 6,072,450 A * | 6/2000 | Yamada et al. | 313/500 |
| 6,191,764 B1 * | 2/2001 | Kono et al. | 313/504 |
| 6,256,120 B1 | 7/2001 | Suzuki et al. | |
| 6,295,106 B1 | 9/2001 | Fukuzawa et al. | |
| 6,580,214 B2 * | 6/2003 | Yoneda et al. | 313/506 |
| 6,653,778 B1 * | 11/2003 | Tomiuchi et al. | 313/501 |
| 6,660,463 B2 | 12/2003 | Noguchi et al. | |
| 6,806,041 B2 | 10/2004 | Noguchi et al. | |
| 6,844,670 B2 | 1/2005 | Kuma et al. | |
| 6,900,470 B2 | 5/2005 | Kobayashi et al. | |
| 7,009,343 B2 | 3/2006 | Lim et al. | |
| 7,086,736 B2 | 8/2006 | Collins et al. | |
| 7,233,104 B2 * | 6/2007 | Kuma et al. | 313/501 |
| 7,265,391 B2 * | 9/2007 | Yamazaki et al. | 257/88 |
| 7,518,146 B2 * | 4/2009 | Yamazaki et al. | 257/72 |
| 7,521,856 B2 * | 4/2009 | Diekmann | 313/504 |
| 7,595,585 B2 * | 9/2009 | Nakua et al. | 313/501 |
| 7,683,535 B2 * | 3/2010 | Fukunaga et al. | 313/506 |
| 7,692,186 B2 * | 4/2010 | Yamazaki et al. | 257/40 |
| 2003/0030880 A1 | 2/2003 | Ramanujan et al. | |
| 2004/0085518 A1 | 5/2004 | Suzuki et al. | |
| 2005/0116619 A1 | 6/2005 | Kuma et al. | |

FOREIGN PATENT DOCUMENTS

| | | |
|---|---|---|
| JP | A-61-091629 | 5/1986 |
| JP | A 3-152897 | 6/1991 |

(Continued)

Primary Examiner — Peter Macchiarolo
(74) Attorney, Agent, or Firm — Oliff & Berridge, PLC

(57) ABSTRACT

An electro-optical device includes a light emitting unit; a color filter that has a plurality of colored portions selectively transmitting light components belonging to a portion of a wavelength range of light emitted from the light emitting unit; and a color converting member that converts some of the light components emitted from the light emitting unit into light components having wavelengths around transmission wavelength ranges of the colored portions having one or more colors of the color filter, which is provided between the light emitting unit and the color filter.

8 Claims, 7 Drawing Sheets

FOREIGN PATENT DOCUMENTS

| | | |
|---|---|---|
| JP | A-10-170918 | 6/1998 |
| JP | A-11-202118 | 7/1999 |
| JP | A-2000-258771 | 9/2000 |
| JP | A 2001-209047 A | 8/2001 |
| JP | A-2001-242459 | 9/2001 |
| JP | A-2002-006303 | 1/2002 |
| JP | A-2002-318556 | 10/2002 |
| JP | A-2003-84141 | 3/2003 |
| JP | A-2003-100126 | 4/2003 |
| JP | A-2004-6133 | 1/2004 |
| JP | A-2004-063189 | 2/2004 |
| KR | 2001-86309 A | 9/2001 |
| WO | WO 03/043382 A1 | 5/2003 |
| WO | WO 03/079735 A1 | 9/2003 |

\* cited by examiner

ELECTRO-OPTICAL DEVICE AND ELECTRONIC APPARATUS FOR A LIQUID CRYSTAL PANEL

This is a Division of application Ser. No. 11/179,657 filed Jul. 13, 2005. The disclosure of the prior application is hereby incorporated by reference herein in its entirety.

BACKGROUND OF THE INVENTION

1. Technical Field

The present invention relates to an electro-optical device and an electronic apparatus.

2. Related Art

In recent years, transmissive or transflective liquid crystal display devices (electro-optical devices) have generally been used for display units of electronic apparatuses. In general, this type of liquid crystal display device includes a liquid crystal panel having a color filter therein and a backlight provided at a rear side of the liquid crystal panel. In addition, in order to reduce the size and power consumption of the backlight, LEDs (light emitting diodes) have come into widespread use as light sources.

Further, there has been suggested a technique for improving the utilization efficiency of a liquid crystal display device in which a backlight has an LED as a light source. For example, Japanese Unexamined Patent Application Publication No. 2000-258771 discloses a technique for converting light emitted from a backlight into color display light with a high degree of efficiency by a combination of a liquid crystal panel having a color converting layer, serving as a color filter, therein and a backlight having a blue LED as a light source.

Recently, in the field of display devices, an improvement in display quality has been strongly demanded. However, a backlight using a white LED, which is the related art, has a problem in that, because emission peaks of G (green) and R (red) light components are low and have wide ranges, the color purity of display light is lowered, resulting in low color reproducibility. However, the technique disclosed in Japanese Unexamined Patent Application Publication No. 2000-258771 has an advantage in that the loss of energy required for obtaining colored light can be reduced, which makes it possible to achieve high-brightness display. However, since light emitted from a color converting layer having a lower degree of freedom in color selection than a color filter is directly used for display, it is difficult to improve the color reproducibility.

SUMMARY

An advantage of the invention is that is provides an electro-optical device capable of displaying high-quality images in multi-color display, and preferably, of displaying high-quality images in four or more color display with a simple structure and at lower manufacturing costs.

According to a first aspect of the invention, an electro-optical device includes a light emitting unit; a color filter that has a plurality of colored portions selectively transmitting light components belonging to a portion of a wavelength range of light emitted from the light emitting unit; and a color converting member that converts some of the light components emitted from the light emitting unit into light components having wavelengths around transmission wavelength ranges of the colored portions having one or more colors of the color filter, which is provided between the light emitting unit and the color filter.

According to this structure, before light emitted from the light emitting unit is incident on the color filter, the light is color-converted by the color converting layers provided between the color filter and the light emitting unit. Therefore, light incident on each colored portion include many colored light components corresponding to the transmission wavelength range of the colored portion, and the emission peak of the colored light becomes sharper. Therefore, display light emitted through the colored portion has a higher degree of color purity, compared to a structure in which the color converting layer is not provided, and thus an image formed by the related colored light can be displayed with high resolution.

Further, in the invention, it is possible to make the wavelength selection characteristic of the colored portion coincide with the spectral characteristic of light emitted from the light emitting unit only by providing the color converting member. Therefore, it is not necessary to change the spectral characteristic of the light emitting unit. Thus, the invention makes it possible to achieve an electro-optical device capable of displaying high-quality images with a simple structure and at low manufacturing costs.

Furthermore, in the invention, the 'electro-optical device' is a device having an electro-optical effect of changing the reflective index of light by a change of the reflective index of a material by an electric field, and also includes a light emitting device for converting electrical energy into optical energy.

Moreover, in the above-mentioned structure, it is preferable that the color converting member be provided corresponding to one or more colored portions and have different wavelength conversion characteristics for the respective colored portions.

According to this structure, the color converting member having different wavelength characteristics according to color types of colored portions is provided. Therefore, the color conversion operation by the color converting member does not have an influence on transmission light of colored portions other than a predetermined colored portion, which makes it possible to further improve the color purity of display light passing through the respective colored portions and thus to raise the utilization efficiency of emission light. As a result, it is possible to achieve bright, high-quality display.

Further, in the above-mentioned structure, it is preferable that the colored portions with four or more colors including red (R), green (G), and blue (B) be provided in the color filter. That is, the electro-optical device of the invention can be properly applied to a multi-color display electro-optical device using a four color filter, and thus the multi-color display electro-optical device can also display high-quality images. For example, cyan (C) and yellow (Y) colored portions can be provided in addition to the R, G, and B colored portions.

Furthermore, in the above-mentioned structure, it is preferable that the color converting member convert some of the light components emitted from the light emitting unit into light components having wavelengths around the transmission wavelength ranges of the colored portions having colors other than R, G, and B. According to this structure, it is possible to improve the display quality of an electro-optical device capable of displaying four or more colors, without changing the characteristics of the light emitting unit.

Moreover, it is preferable that the electro-optical device further include a light modulating unit that modulates the light components emitted from the light emitting unit. That is, the electro-optical device can perform high gray-scale level display by modulating light emitted from the light emitting unit.

Further, in the above-mentioned structure, it is preferable that the color converting member be provided between the light emitting unit and the light modulating unit. According to this structure, it is possible to improve display quality without changing the structure of the light modulating unit, and to easily manufacture an electro-optical device at low manufacturing costs.

Furthermore, in the above-mentioned structure, it is preferable that the light modulating unit be a liquid crystal panel having a pair of substrates and a liquid crystal layer interposed therebetween. According to this structure, it is possible to achieve an electro-optical device capable of displaying high-quality images.

In addition, it is preferable that the color converting member be provided on a surface of one of the substrates facing the liquid crystal layer in the liquid crystal panel. According to this structure, it is possible to provide the color converting member when the liquid crystal panel is manufactured, which makes it possible to improve the efficiency of manufacture and to easily provide the color converting member to each display unit (dot) of the liquid crystal panel.

Further, in the above-mentioned structure, it is preferable that the light emitting unit be an illuminating device including a cold-cathode tube, an LED, or an EL element. In addition, the invention can be properly applied to an electro-optical device including the illuminating device having the above-mentioned structure. In the illuminating device having the cold-cathode tube and the LED or EL element as a light source, light having a unique spectral characteristic may be emitted due to the structure or forming material thereof. Therefore, even if the structure of forming material is changed, it is difficult to make the characteristic of emission light coincide with the wavelength selection characteristic of the color filter having multi-colors. In addition, when a light source is replaced, the manufacturing cost of an illuminating device increases because the illuminating device is a dedicated device. However, when the emission characteristics of the cold-cathode tube and the LED or EL element is made coincide with the wavelength selection characteristic of the color filter by the color converting member as in the invention, it is possible to achieve high-quality display, without increasing the manufacturing cost of an illuminating device, because a general-purpose illuminating device can be used as the illuminating device.

Furthermore, in the electro-optical device of the invention, it is preferable that the illuminating device include a light source and an optical waveguide that guides light emitted from the light source to the color filter, and that the optical waveguide have the function of the color converting member. As such, according to the above-mentioned structure in which the optical waveguide has the color converting function, it is not necessary to provide a sheet-shaped color converting member, which contributes to a reduction in the thickness of an electro-optical device.

Moreover, in the above-mentioned structure, it is preferable that the light emitting unit be provided with a plurality of EL elements that can be independently driven, and that the EL elements be arranged corresponding to the colored portions of the color filter, respectively. That is, the electro-optical device of the invention can be formed of an EL display device in which light emitted from an EL element is converted into colored light by colored portions, thereby performing multi-color display. In this case, the EL display device can also display high-quality images.

According to another aspect of the invention, an electronic apparatus includes the above-mentioned electro-optical device. According to this structure, it is possible to provide an electronic apparatus having a display unit capable of displaying high-quality images.

BRIEF DESCRIPTION OF THE DRAWINGS

The invention will be described with reference to the accompanying drawings, wherein like numbers reference like elements, and wherein.

DESCRIPTION OF THE EMBODIMENTS

Figure 1:
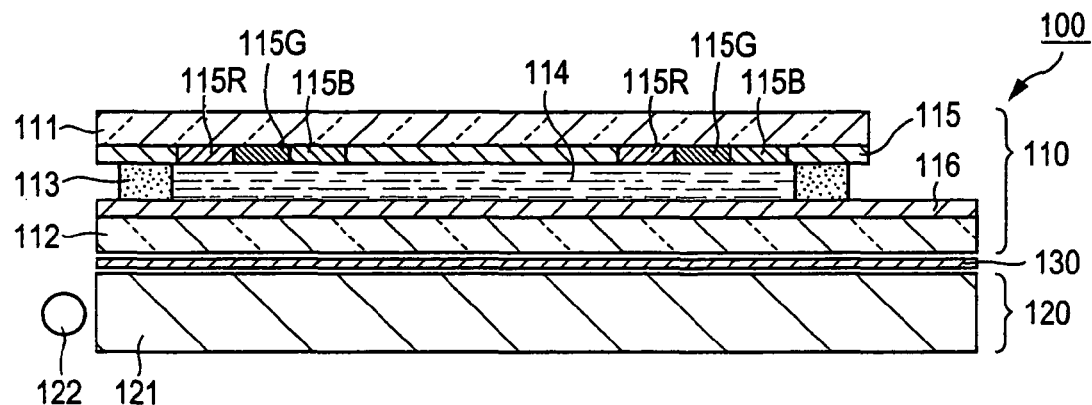
FIG. 1 is a view illustrating the sectional structure of a liquid crystal display device according to a first embodiment of the invention.

Hereinafter, preferred embodiments of the invention will be described with reference to the accompanying drawings. In the drawings, layers or members have different scales to be made recognizable, and some of the layers and members may be omitted for the convenience of illustration.

First Embodiment

Figure 2:
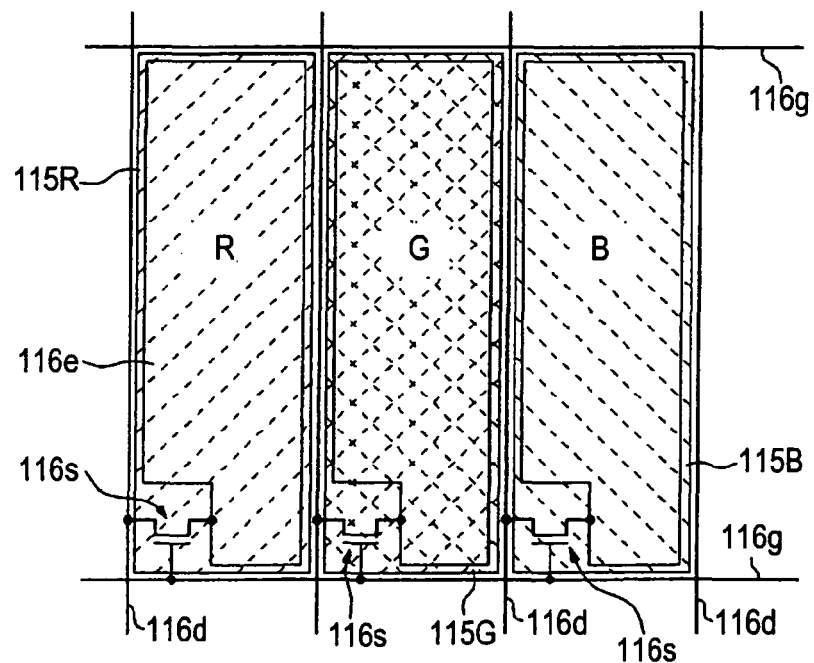
FIG. 2 is a plan view schematically illustrating a pixel region of the liquid crystal display device.

FIG. 1 is a cross-sectional view illustrating the structure of a liquid crystal display device, which is a first embodiment of an electro-optical device according to the invention, and FIG. 2 is a plan view schematically illustrating one pixel region (three dots) of the liquid crystal display device.

A liquid crystal display device 100 is a transmissive color liquid crystal display device of an active matrix type, and includes a liquid crystal display panel (light modulating unit) 110, a backlight (illustrating unit) 120, and a color converting sheet (color converting member) 130 provided therebetween.

The liquid crystal panel 110 includes a pair of substrates 111 and 112 arranged opposite to each other and a liquid crystal layer 114 that is interposed between the substrates 111 and 112 and that is sealed by a sealing material 113. A color filter 115 is provided on a surface of the front (the upper side of FIG. 1) substrate 111 facing the liquid crystal layer 114, and a circuit layer 116 is provided on a surface of the rear (the lower side of FIG. 1) substrate 112 facing the liquid crystal layer 114.

The substrates 111 and 112 can be made of a transmissive (transparent) material, such as glass, quartz, or plastic, in a transmissive liquid crystal display device. Any types of liquid crystal capable of being arranged in a predetermined alignment state can be used for the liquid crystal layer 11, and in general, nematic liquid crystal is used therefor. In addition, a vertical alignment mode as well as a TN mode can be applied as an initial alignment mode of liquid crystal.

Three (R, G, and B) colored portions 115R, 115G, and 115B are periodically arranged in the color filter 115 in plan view. Although not shown, an electrode, serving as a member for applying an electric field to the liquid crystal layer, is provided on a surface of the color filter 115 facing the liquid crystal layer 114. The circuit layer 116 includes at least electrodes for applying an electric field to the liquid crystal layer 114 together with the electrode formed on the substrate 111. In this embodiment, a TFT (thin film transistor) is provided as a pixel switching element.

Referring to the schematic plan view shown in FIG. 2, a plurality of data lines 116d and a plurality of scanning lines 116g are formed on the circuit layer 116 of the liquid crystal panel 110 so as to extend perpendicular to each other, and a rectangular region surrounded by the data lines and the scanning lines is used as a dot region. In the circuit layer 116, each dot region is provided with a pixel electrode 116e and a TFT 116s, and the pixel electrode 116e is connected to the data line 116d and the scanning line 116g through the TFT 116s. In the dot regions, the pixel electrodes 116e are provided in the circuit layer 116 on the substrate 112 so as to respectively overlap the colored portions 115R, 115G, and 115B in plan view, and three dot regions including the colored portions 115R, 115G, and 115B constitute a pixel region of the liquid crystal display device 100.

The backlight 120 includes an optical waveguide 121 and a light source (light-emitting unit) 122 provided at a side surface (a left surface in FIG. 1) of the optical waveguide 121 as the main components. Therefore, light emitted from the light source 122 is introduced into the optical waveguide 121 through the side surface of the optical waveguide. Then, the light travels inside the optical waveguide and is emitted from an upper surface of the optical waveguide 121 toward the liquid crystal panel 110.

The light modulating sheet 130 is an optical sheet for modulating some of the incident light components into light components in a predetermined wavelength range, and can be composed of a sheet formed by mixing a fluorescent material or pigment with a resin material, a dielectric half mirror obtained by laminating dielectric films having different refractive indexes, or a half mirror using an Al film.

Figure 3:
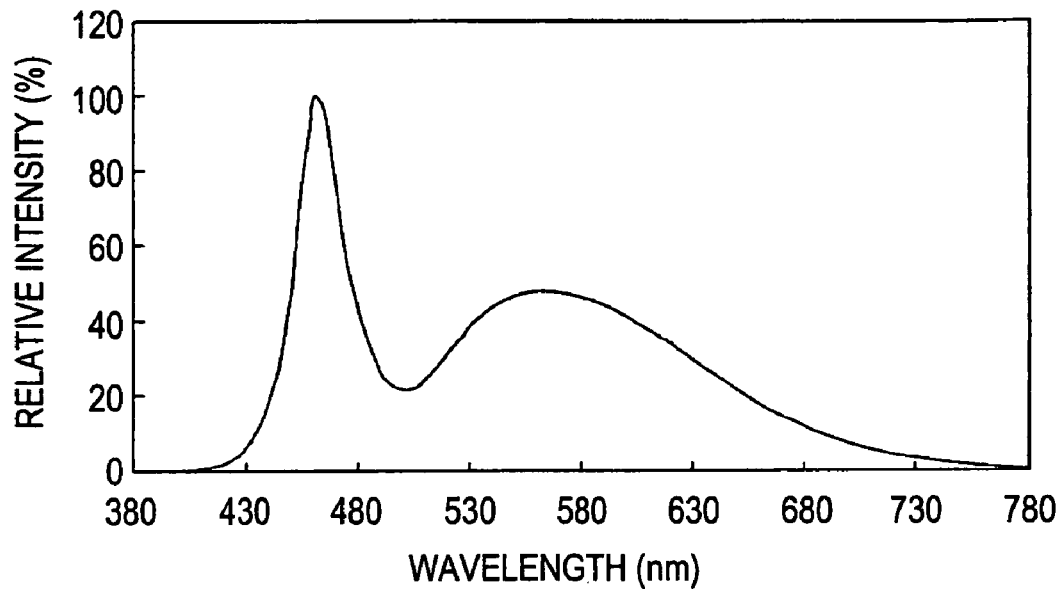
FIG. 3 is a graph illustrating a spectral characteristic of a light source of a backlight.

In this embodiment, the light source 122 is provided with a white LED (light-emitting diode) having the spectral characteristic shown in FIG. 3. In the light source 122, white light is obtained by passing light emitted from a blue light emitting chip, which is well known in the related art, through a yellow fluorescent material. The blue light emitting chip is formed, for example, by growing GaInN-based compound semiconductor crystal on the surface of a substrate made of, for example, sapphire ($Al_2O_3$), and preferably has a double hetero-junction structure in which a light-emitting layer made of InGaN is provided between a clad layer made of n-GaN and a clad layer made of p-GaN.

Figure 4:
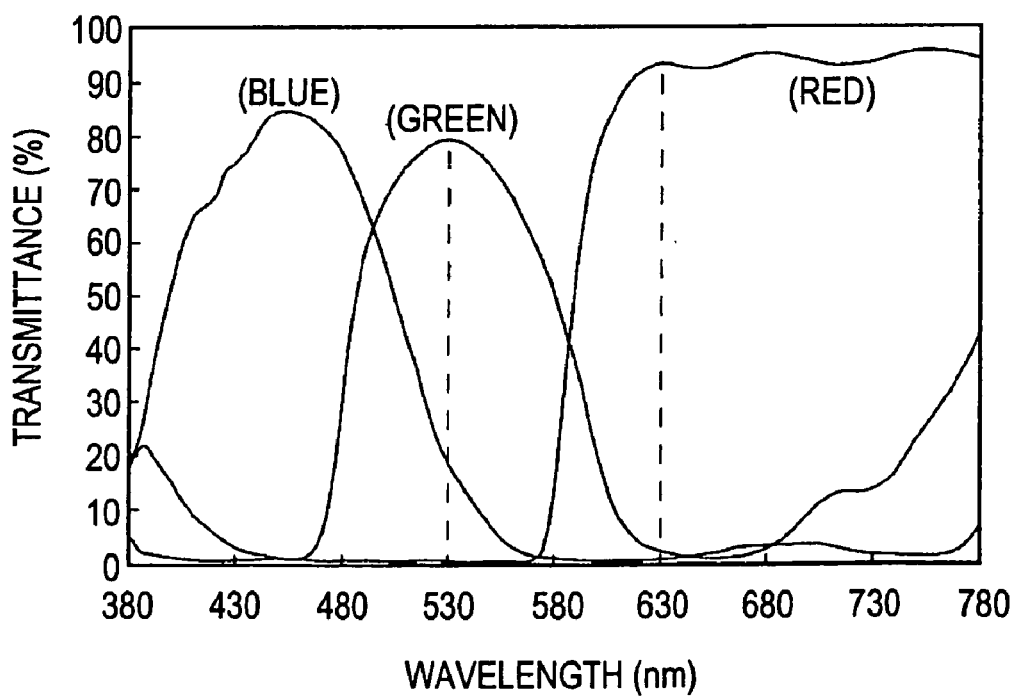
FIG. 4 is a graph illustrating a wavelength selection characteristic of a color filter.

As shown in FIG. 3, in the light source 122 having the above-mentioned structure, a sharp light-emitting peak is in a blue light range (420 to 490 nm), and the emission intensity of light within a green light range (520 to 570 nm) to a red light range (590 to 630 nm) is smaller than that within the blue light range. In addition, these wavelength ranges have a gentle distribution in emission intensity. Meanwhile, the wavelength selection characteristic of the color filter 115 of the liquid crystal panel 110 is as shown in FIG. 4. When light emitted from the backlight 120 passes through the color filter 115 to perform display, a relatively high degree of purity is obtained with respect to the blue light, but the emission intensity of green light and red light does not have a sharp peak in the spectral characteristic of display light, which results in the deterioration of color purity.

Figure 5:
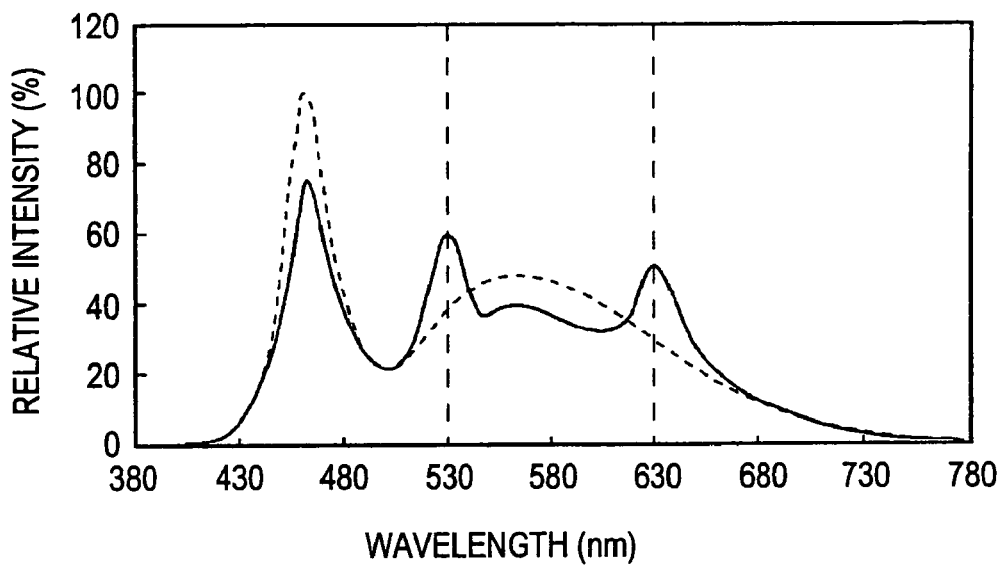
FIG. 5 is a spectral characteristic graph illustrating the operation of a color converting layer.

In the liquid crystal display device 100 of this embodiment, since the color converting sheet 130 is provided between the backlight 120 and the liquid crystal panel 110, the spectral characteristic of light emitted from the backlight 120 is changed so as to coincide with the wavelength selection characteristic of the color filter. That is, the light emitted from the backlight 120 passes through the color converting sheet 130 to obtain illumination light having the spectral characteristic shown in FIG. 5, in which a sharp emission peak appears in a wavelength range corresponding to green light and red light. Therefore, in the liquid crystal display device 100, illumination light having the spectral characteristic shown in FIG. 5 is incident on the liquid crystal panel 110, and then passes through the color filter 115 to perform color display, so that three primary color light components, that is, a blue light component, a green light component, and a red light component, can have high degrees of color purity. Thus, the liquid crystal display device 100 can display a high-quality image.

Further, the white LED may have, for example, a structure in which red, green, and blue light emitting chips are integrated into a single LED element and a structure in which a red LED, a green LED, and a blue LED are used as a set of light emitting units, as well as the structure having the spectral characteristic shown in FIG. 3. These structures enable each color display light component to have a relatively high degree of color purity.

A light-emitting element that obtains white light by a combination of plural color-light-emitting chips has higher manufacturing costs than that which obtains white light by a combination of a single color-light-emitting chip and a fluorescent material. When a combination of plural color LEDs is used to obtain white light, color separation may occur at the surface of the optical waveguide. In addition, when the emission characteristic of the light-emitting chip does not coincide with the wavelength selection characteristic of the color filter, it is necessary to adjust the optical characteristics of the color filter or the light-emitting element, resulting in an increase in manufacturing costs.

On the contrary, the liquid crystal display device of this embodiment can perform display with a high degree of color purity using a light-emitting unit that obtains white light from a single light-emitting chip. Therefore, it is possible to obtain high-quality display while effectively preventing an increase in manufacturing costs.

When the color converting sheet 130 for converting illumination light having the spectral characteristic shown in FIG. 3 into illumination light having the spectral characteristic shown in FIG. 5 contains, for example, fluorescent pigments, it is composed of a transmissive sheet obtained by mixing a resin material with a fluorescent pigment for converting blue light into green light and a fluorescent pigment for converting blue light and green light into red light. As the resin material forming the color converting sheet, any of the following transmissive resins can be used: polymethyl methacrylate, polyacrylate, polycarbonate, polyvinyl alcohol, polyvinyl pyrrolidone, hydroxyethylcellulose, carboxymethylcellulose, polyvinylchloride resin, melamine resin, phenol resin, alkyd resin, epoxy resin, polyurethane resin, polyester resin, maleic resin, and polyamide resin.

The fluorescent pigment for converting blue light into green light can be composed of, for example, a coumarin pigment, such as 2,3,5,6-1H,4H-tetrahydro-8-trifluoromethylquinolizino (9,9a,1-gh) coumarin (coumarin 153), 3-(2'-benzothiazolyl)-7-diethylaminocoumarin (coumarin 6), 3-(2'-benzimidazolyl)-7-N, or N-diethylaminocoumarin (coumarin 7), or a naphthalimido pigment, such as basic yellow-51, solvent yellow-11, or solvent yellow-116.

The fluorescent pigment for converting blue or green light into red light can be composed of, for example, a cyanine-based pigment, such as 4-dicyanomethylene-2-methyl-6-(p-dimethylaminostyl)-4H-pyran (hereinafter, referred to as DCM), a pyridine-based pigment, such as 1-ethyl-2-(4-(p-dimethylaminophenyl)-1,3-butadiene)-pyridinium-perchlorate (hereinafter, referred to as pyridine 1), a rhodamine-based pigment, such as rhodamine B or rhodamine 6G, or an oxazine-based pigment.

The above-mentioned fluorescent material can be composed of polymethacrylic acid ester, polyvinyl chloride, vinyl chloride-vinyl acetate resin, alkyd resin, aromatic sulfonamide resin, urea resin, melamine resin, benzoguanamine resin, or a mixture of these resins.

It is preferable that the resin material used as a base material of the color converting sheet 130 and the resin material used as a binder of the fluorescent pigment do not generate quenching and decoloring and do not deteriorate the fluorescence of the fluorescent pigment. For example, a basic resin is more preferable because it has an electron-donating property within the reach of a π electron and it does not interact with a basic fluorescent pigment. In addition, it is preferable that the resin material have high transmittance with respect to visible rays.

In the color converting sheet 130 according to this embodiment, as shown in FIG. 3, the light source 122 has a broad emission intensity distribution in the wavelength range of green to red. Therefore, as described above, the light source has a color conversion characteristic in which green light and red light have sharp emission peaks. However, it goes without saying that the color conversion characteristic of the color converting sheet 130 can be properly changed according to the spectral characteristic of the light source. For example, when an element emitting ultraviolet rays or violet light is provided in the light source 122, a fluorescent pigment is further provided to convert some of the light components emitted from the light source 122 into a blue light component. As the fluorescent pigment converting ultraviolet rays or violet light into a blue light component, the following pigments can be used: a stilbene-based pigment, such as 1,4-bis(2-methylstyryl) benzene (Bis-MSB) or trans-4,4'-diphenyl stilbene (DPS), and a coumarin-based pigment, such as 7-hydroxy-4-methylcoumarin (coumarin 4).

In the above-described first embodiment, the color converting sheet 130 is provided substantially on the entire surface (light emission surface) of the optical waveguide 121 facing the liquid crystal panel 110. A structure in which the optical waveguide 121 of the backlight 120 has a color conversion function is exemplified as the structure in which a color converting layer is provided to act on the entire display region of the liquid crystal panel 110. In this case, in the manufacturing process of the optical waveguide 121, it is possible to obtain the optical waveguide 121 having a desired color conversion characteristic by mixing the above-mentioned fluorescent material with a resin material for forming the optical waveguide.

Second Embodiment

Next, a liquid crystal display device, which is a second embodiment of the electro-optical device according to the invention, will be described with reference to FIG. 6.

Figure 6:
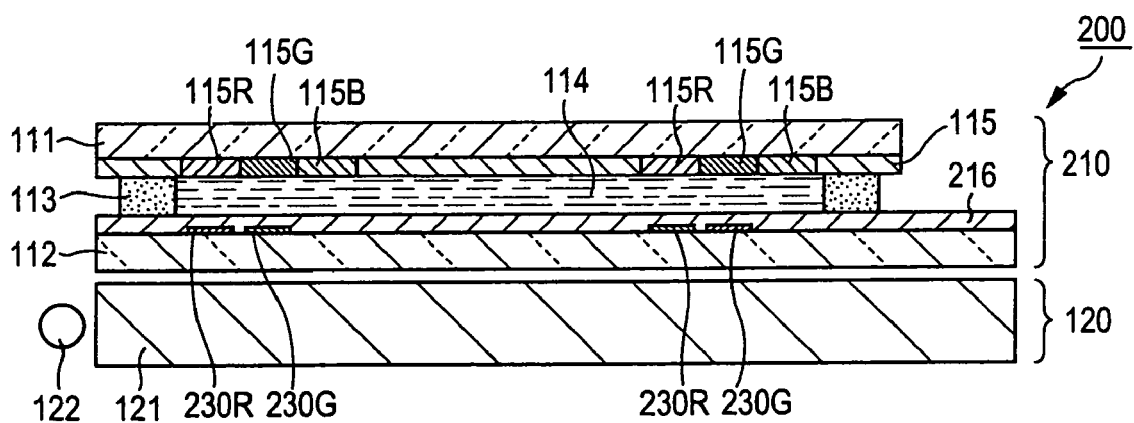
FIG. 6 is a view illustrating the sectional structure of a liquid crystal display device according to a second embodiment.

FIG. 6 is a cross-sectional view illustrating the liquid crystal display device according to the second embodiment. A liquid crystal display device 200 of this embodiment is a transmissive color liquid crystal display device of an active matrix type, similar to the first embodiment, and includes a liquid crystal panel (light modulating unit) 210 and the backlight unit (illuminating device; light emitting unit) 120 as the main components.

Further, the plan-view structure of the pixel region of the liquid crystal display device 200 is the same as that of the liquid crystal display device 100 shown in FIG. 2. In FIG. 6, the same components as those in FIG. 1 or 2 have the same reference numerals, and a description thereof will be omitted for the convenience of explanation.

The liquid crystal display device 200 of this embodiment is characterized in that the color converting members for changing the spectral characteristic of illumination light incident on the color filter 115 are provided as color converting layers 230R and 230G in an inner surface (a surface facing the liquid crystal layer) of a substrate of the liquid crystal panel 200 to correspond to predetermined dot regions.

More specifically, the color converting layers 230R and 230G are provided in a circuit layer 216 that is formed on a surface of the substrate 112 facing the liquid crystal layer. The color converting layer 230R is provided corresponding to the red dot region having the colored portion 115R therein, and the color converting layer 230G is provided corresponding to the green dot region having the colored portion 115G therein. The color converting layer is not provided in the blue dot region having the colored portion 115B therein, so that light emitted from the backlight 120 directly travels toward the colored portion 115B through the liquid crystal layer 114.

Further, the color converting layers 230R and 230G can be formed at any positions between the substrate 112 and electrodes (the pixel electrodes 116e shown in FIG. 2) included in the circuit layer 216. That is, as shown in FIG. 6, the color converting layers may be formed on the surface of the substrate 112 or on a layer adjacent to the pixel electrodes. Alternatively, the color converting layers 230R and 230G may be formed on an inner surface (a surface facing the liquid crystal layer) of the substrate 111 opposite to the substrate 112. When the color converting layers are formed on the substrate 111 having the color filter 115 thereon, the color converting layers may be provided between the color filter 115 and the electrode on the substrate 111.

The color converting layers 230R and 230G can be composed of a resin film made of a resin material containing a fluorescent pigment or a half mirror using an inorganic material, similar to the color converting sheet 130 of the first embodiment. In this embodiment, the color converting layers 230R and 230G are provided corresponding to the colors of the colored portions of the color filter 115, so that the color converting layers 230R and 230G can have different color conversion functions. This structure enables illumination light having the optimal spectral characteristic to be incident on a specific colored portion, without affecting dot regions having different colors, which makes it possible to improve the color purity of the three primary color light components and to achieve high-quality display. In addition, blue light that is not used for display is converted into green light and red light in the green and red dot regions where the color converting layers are formed, while the lowering of the intensity of blue light caused by color conversion does not occur in the blue dot region where the color converting layer is not provided. Therefore, it is possible to improve the efficiency of light source utilization with respect to the primary color light components, thereby achieving brighter display.

As in this embodiment in which the color converting layers 230R and 230G are formed in a pattern on the inner surface of the substrate 112, it is preferable that the color converting layers 230R and 230G be made of an inorganic material. The reason is that, because the color converting layer made of an inorganic material is formed using a dielectric half mirror formed by alternately laminating a $SiO_2$ film and a $TiO_2$ film, or a half mirror using an Al film, the color converting layer can be easily patterned with high accuracy by the well-known photolithography technique. These half mirrors can easily change the wavelength range of transmission light by adjusting the thickness of the laminated film or metal film.

Further, it goes without saying that a resin film containing a fluorescent pigment can be used as the color converting layer. In this case, the color converting layer 230G corresponding to the green dot region contains a fluorescent pigment to convert blue light into green light, and the color converting layer 230R corresponding to the red dot region contains a fluorescent pigment to convert blue light or green light into red light. The resin film is made of a photosensitive resin to which the photolithography technique can be applied, for example, a photo-curable resist material having a reactive vinyl group, such as an acrylic acid-based material, a methacrylic acid-based material, a polycinnamic acid vinyl-based material, or a cyclized rubber-based material. Therefore, the resin film can be patterned. More specifically, for example, a solution is prepared by dissolving or dispersing a fluorescent pigment or fluorescent dye into a proper solvent, and a spin coating method, a roll coating method, a bar coating method, a casting method, or a dipping method is performed on the solution to form a resin film. Then, drying, exposure, development, and patterning are sequentially performed on the resin film, so that a color converting layer can be formed at a predetermined position.

Third Embodiment

Figure 7:
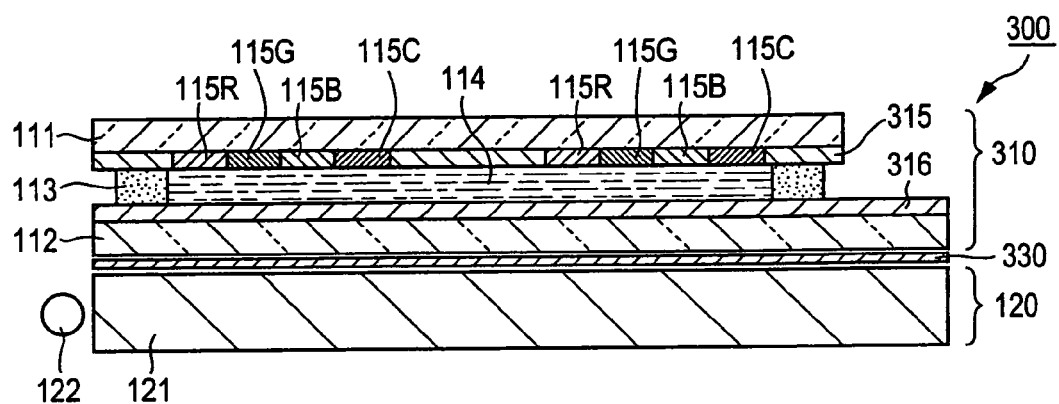
FIG. 7 is a view illustrating the sectional structure of a liquid crystal display device according to a third embodiment.

Next, a liquid crystal display device, which is a third embodiment of the electro-optical device according to the invention, will be described with reference to FIG. 7.

A liquid crystal display device 300 of this embodiment is a transmissive color liquid crystal display device of an active matrix type, similar to the first and second embodiments, and includes a liquid crystal panel (light modulating unit) 310, the backlight unit (illuminating device; light emitting unit) 120, and a color converting sheet (color converting member) 330 provided between the liquid crystal panel 310 and the backlight 120.

Further, the plan-view structure of a pixel region of the liquid crystal display device of this embodiment is different from that of the liquid crystal display device 100 shown in FIG. 2 in that four dots are used corresponding to four primary colors. In FIG. 7, the same components as those in FIGS. 1 to 6 have the same reference numerals, and a description thereof will be omitted for the convenience of explanation.

The liquid crystal panel 310 includes a pair of substrates 111 and 112 arranged opposite to each other and a liquid crystal layer 114 that is interposed between the substrates 111 and 112 and that is sealed by a sealing material 113. A color filter 315 is provided on a surface of the substrate 111 facing the liquid crystal layer 114, and a circuit layer 316 is provided on a surface of the substrate 112 facing the liquid crystal layer 114. As shown in FIG. 7, the color filter 315 is a four-color filter in which four colored portions 115R (red), 115G (green), 115B (blue), and 115C (cyan) are periodically arranged. Similar to the first embodiment, pixel electrodes for applying an electric field to liquid crystal are arranged in a matrix in plan view on the circuit layer 316, and the colored portions 115R, 115G, 115B, and 115C are arranged corresponding to the pixel electrodes, respectively, thereby forming dot regions that can be independently driven.

Further, the color converting sheet 330 of this embodiment changes the spectral characteristic of illumination light emitted from the backlight 120 according to the wavelength selection characteristic of each colored portion of the four-color filter 315 to improve the color purity of the primary color light components constituting display light. Thus, the liquid crystal display device having the four-color filter can also display high-quality images with a high degree of color purity.

Figure 8:
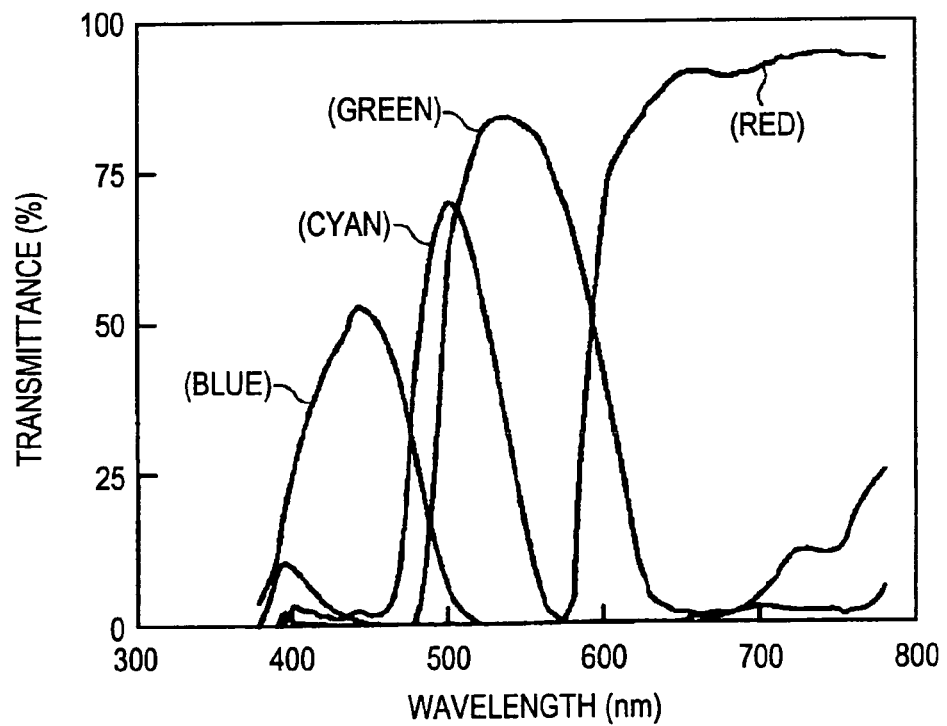
FIG. 8 is a graph illustrating a wavelength selection characteristic of a color filter.

The four-color filter 315 has the wavelength selection characteristic shown in FIG. 8 in which a transmittance curve (Cyan) of the cyan colored portion 115C has a peak between the peak of a transmittance curve (Blue) of the blue colored portion 115B and the peak of a transmittance curve (Green) of the green colored portion 115G. Meanwhile, the backlight 120 has the spectral characteristic shown in FIG. 3.

As apparently seen from the comparison between FIG. 3 and FIG. 8, a peak wavelength (about 500 nm) of the colored portion 115C in transmittance corresponds to a region where the intensity of emitted light is lower than that within other wavelength ranges in the spectral characteristic of the backlight 120. Therefore, when illumination light emitted from the backlight 120 is incident on the color filter 315, it is difficult for the red light, green light and cyan light constituting display light to have good color purity, and the cyan light cannot have sufficient brightness, compared to other color light components.

Figure 9:
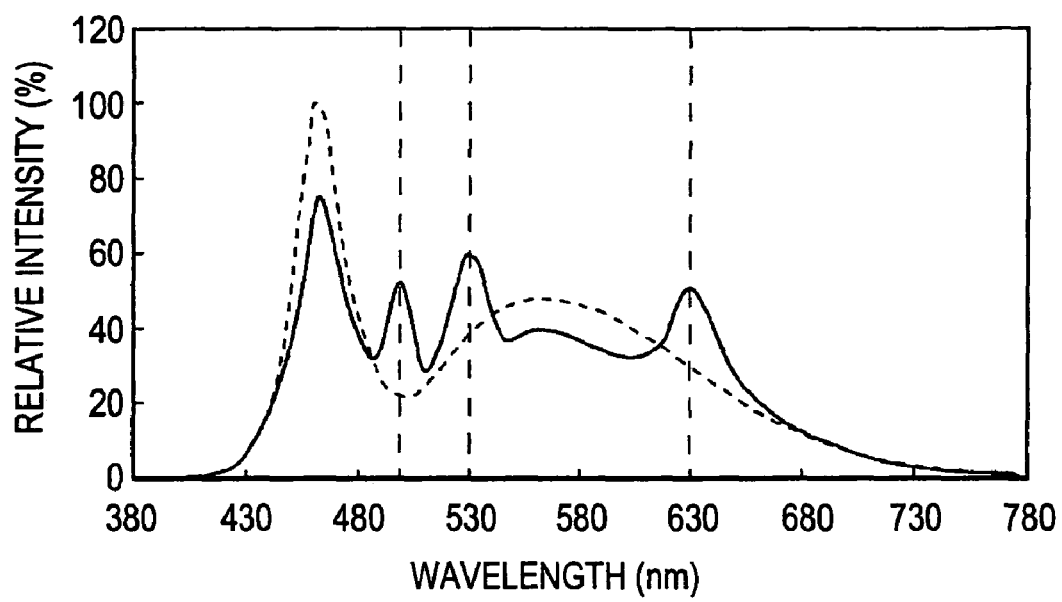
FIG. 9 is a spectral characteristic graph illustrating the operation of a color converting layer.

FIG. 9 is a spectral characteristic graph illustrating the color conversion characteristic of the color converting sheet 330. In FIG. 9, a curve represented by a dashed line is a curve indicating the emission intensity of the backlight 120. As shown in FIG. 9, the color converting sheet 330 changes the spectral characteristic of illumination light emitted from the backlight 120 such that the illumination light has emission intensity peaks at wavelengths of about 500 nm, 530 nm, and 630 nm. Therefore, when the color converting sheet 330 having related color conversion characteristics is provided between the backlight 120 and the liquid crystal panel 310, illumination light whose wavelength ranges include emission peaks substantially coinciding with the wavelength selection characteristics of the colored portions 115R, 115G, 115B, and 115C can be incident on the colored portions 115R, 115G, 115B, and 115C, and thus it is possible to improve the color purity of display light. In addition, it is possible to raise the emission intensity of cyan light, which is a small wavelength component of the illumination light emitted from the backlight 120, which makes it possible to achieve high-quality display.

Figure 10:
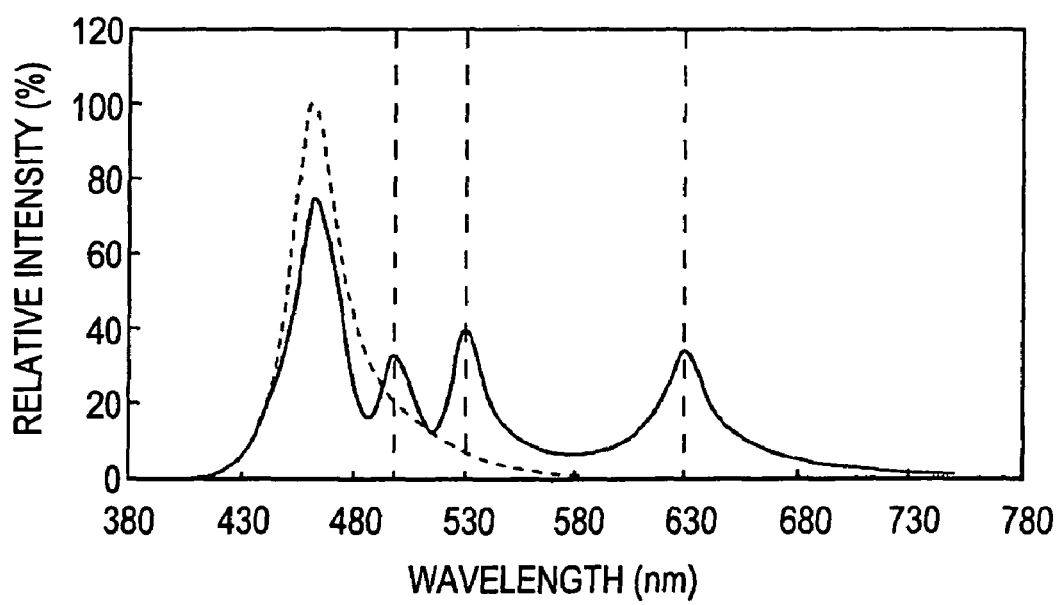
FIG. 10 is a graph illustrating a spectral characteristic when a light source is replaced.

In the above-mentioned embodiments, as the light source 122 of the backlight 120, a white LED is used in which light emitted from the blue light-emitting chip passes through a yellow fluorescent material. However, a blue LED can be used as the light source 122. FIG. 10 is a graph showing a curve (dashed line) indicating the emission intensity of illumination light when the blue LED is used as the light source 122 and a curve (solid line) indicating the emission intensity of illumination light after the illumination light passes through the color converting sheet 330. As shown in FIG. 10, when the blue LED is used as the light source 122, cyan light (around a wavelength of about 500 nm), green light (around a wavelength of about 530 nm), and red light (around a wavelength of about 630 nm) are generated from blue light by the color converting sheet 330, so that illumination light having sharp emission intensity peaks at the respective wavelengths can be incident on the liquid crystal panel 310. Therefore, it is possible to make illumination light corresponding to the wavelength selection characteristics of the colored portions 115R, 115G, 115B, and 115C incident on the colored portions, respectively, which make it possible to improve the color purity of display light, thereby displaying high-quality images.

Further, when the blue LED is used as the light source 122, it is possible to manufacture a backlight at costs equal to or lower than that where the backlight having the white LED is manufactured, which prevents an increase in the manufacturing costs of a backlight caused when plural color light emitting chips or LEDs are used and the color separation by the optical waveguide.

The detailed structure of the color converting sheet 330 is substantially similar to that of the color converting sheet 130 according to the first embodiment. However, when the color converting sheet 330 is composed of, for example, a resin sheet containing a fluorescent pigment, the resin sheet contains a fluorescent pigment converting blue light into cyan light. As the fluorescent pigment, any of the following pigments can be used: a coumarin pigment, such as 2,3,5,6-1H, 4H-tetrahydro-8-trifluoromethylquinolizino (9,9a,1-gh) coumarin (coumarin 153), 3-(2'-benzothiazolyl)-7-diethylaminocoumarin (coumarin 6), 3-(2'-benzimidazolyl)-7-N, or N-diethylaminocoumarin (coumarin 7), and a naphthalimido pigment, such as basic yellow-51, solvent yellow-11, or solvent yellow-116.

Furthermore, when the dielectric half mirror or the metal film half mirror is used as the main part of the color converting sheet 330, it is preferable to make the cyan light selectively pass through a dielectric film or metal film constituting the dielectric half mirror or metal film half mirror by adjusting the thickness thereof.

Moreover, it is preferable that the optical waveguide 121 of the backlight 120 be made of a resin material containing a fluorescent pigment, so that the optical waveguide 121 can have a color converting function.

Fourth Embodiment

Figure 11:
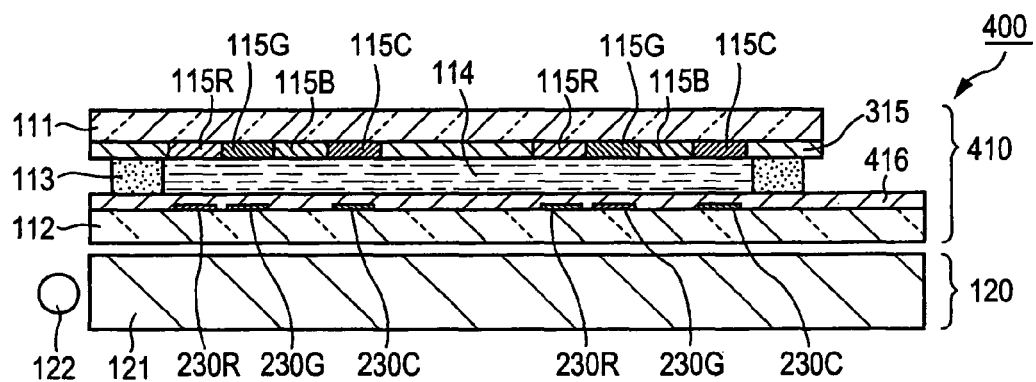
FIG. 11 is a view illustrating the sectional structure of a liquid crystal display device according to a fourth embodiment.

Next, a fourth embodiment of the invention will be described with reference to FIG. 11. A liquid crystal display device 400 of this embodiment is a transmissive color liquid crystal display device of an active matrix type, similar to the first to third embodiments, and includes a liquid crystal panel (light modulating unit) 410 and the backlight unit (illuminating device; light emitting unit) 120.

Further, the plan-view structure of a pixel region of the liquid crystal display device of this embodiment is different from that of the liquid crystal display device 100 shown in FIG. 2 in that four dots are used corresponding to four primary colors. In FIG. 11, the same components as those in FIGS. 1 to 10 have the same reference numerals, and a description thereof will be omitted for the convenience of explanation.

The liquid crystal panel 410 includes a pair of substrates 111 and 112 arranged opposite to each other and a liquid crystal layer 114 that is interposed between the substrates 111 and 112 and that is sealed by a sealing material 113. A color filter 315 is provided on a surface of the substrate 111 facing the liquid crystal layer 114, and a circuit layer 416 is provided on a surface of the substrate 112 facing the liquid crystal layer 114. The color filter 315 is a four-color filter in which four colored portions 115R (red), 115G (green), 115B (blue), and 115C (cyan) are periodically arranged, similar to the liquid crystal display device 300 according to the third embodiment.

Similar to the third embodiment, pixel electrodes (not shown) for applying an electric field to liquid crystal are arranged in a matrix in plan view on a lower surface (a surface facing the substrate 112) of the circuit layer 316, and color converting layers (color converting members) 230R, 230G, and 230C are arranged corresponding to some of the pixel electrodes, respectively, in this embodiment. That is, in the liquid crystal panel 410, the color converting layer 230R is provided corresponding to a red dot region having the colored portion 115R therein, and the color converting layer 230G is provided corresponding to a green dot region having the colored portion 115G therein. In addition, the color converting layer 230C is provided corresponding to a cyan dot region having the colored portion 115C therein. The forming positions of the color converting layers 230R, 230G, and 230C on the circuit layer 416 of the substrate 112 is not limited to the surface of the substrate 112, similar to the second embodiment, but the color converting layers can be formed at any positions between the substrate 112 and the electrodes included in the circuit layer 416.

The color converting layers 230R, 230G, and 230C can have the same structure as the color converting layers 230R and 230G of the second embodiment, and can be formed of a resin film made of a resin material containing a fluorescent pigment or of a half mirror made of an inorganic material. In this embodiment, the color converting layers 230R, 230G, and 230C are provided corresponding to the colors of the colored portions of the color filter 315, and thus the color converting layers 230R, 230G, and 230C can have different color converting functions. This structure enables illumination light having the optimal spectral characteristic to be incident on a specific colored portion, without affecting dot regions having different colors, which makes it possible to improve the color purity of the respective primary color light components and to achieve high-quality display. In addition, blue light that is not used for display is converted into cyan light, green light, and red light in the cyan, green, and red dot regions where the color converting layers are formed, while the lowering of the intensity of blue light caused by color conversion does not occur in the blue dot region where the color converting layer is not provided. Therefore, it is possible to improve the efficiency of light source utilization with respect to the primary color light components, thereby achieving brighter display.

As in this embodiment in which the color converting layers 230R, 230G, and 230C are formed in a pattern on the inner surface of the substrate 112, it is preferable that the color converting layers 230R, 230G, and 230C be made of an inorganic material. The reason is that, because the color converting layer made of an inorganic material is formed using a dielectric half mirror formed by alternately laminating $SiO_2$ films and $TiO_2$ films, or a half mirror using an Al film, the color converting layer can be easily patterned with high accuracy by the well-known photolithography technique. These half mirrors can easily change the wavelength range of transmission light by adjusting the thickness of the laminated film or metal film. In addition, it goes without saying that a color converting layer can be formed by patterning a resin film containing a fluorescent pigment.

Fifth Embodiment

Next, a fifth embodiment of the invention will be described with reference to FIG. 12. Hereinafter, an organic EL device according to an embodiment of the electro-optical device of the invention will be described.

Figure 12:
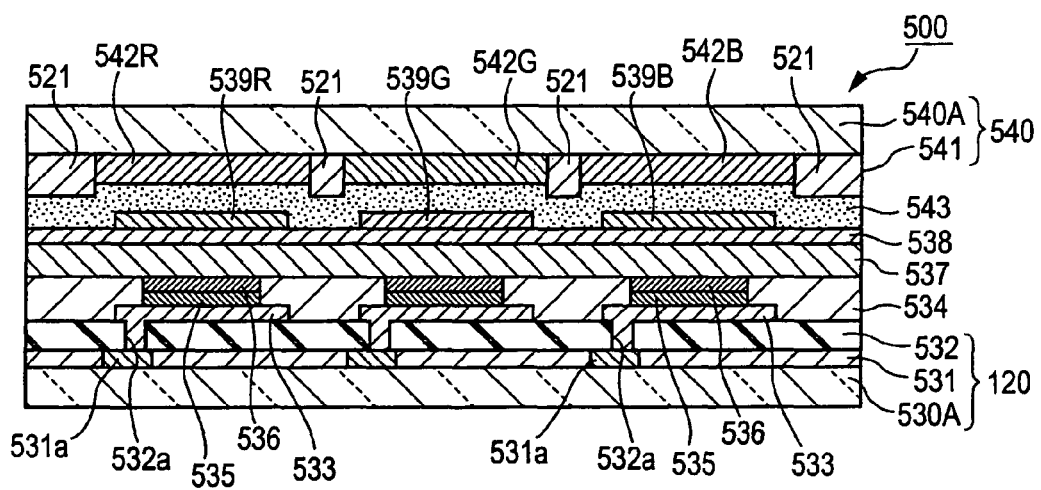
FIG. 12 is a view illustrating the sectional structure of an organic EL display device according to a fifth embodiment.

As shown in FIG. 12, an organic EL device 500 of this embodiment is a top-emission-type full color organic EL display device in which an element substrate 530 having EL elements (light-emitting elements) formed thereon and a counter substrate 540 having R (red), G (green), and B (blue) colored portions 542R, 542G, and 542B formed thereon are bonded to each other by an adhesive layer 543 interposed therebetween. In the organic EL display device 500 of this embodiment, a bank layer 534 for partitioning pixels is formed on the element substrate 530 having anodes (pixel electrodes) 533 provided therein. An organic EL layer formed by laminating a hole injecting/transporting layer 535 and a light-emitting layer 536 containing a white light emitting material is formed in regions partitioned by the bank layer 534. That is, openings are formed in the bank layer 534 at positions corresponding to the respective pixel, and the organic EL layer is formed on the anodes 533 exposed through the openings. Then, a cathode (counter electrode) 537 is formed so as to cover the bank layer 534 and the organic EL layer.

Since this embodiment adopts the top emission structure in which light generated from the organic EL layer is emitted from the cathode, a codeposition film of BCP (bathocuproine) and cesium is used for the cathode 537, and an ITO film is formed thereon to give conductivity. In addition, in order to make light emitted from the anode 533 travel toward the cathode, the anode 533 is made of a metallic material having high reflectance, such as Al or Ag, or is composed of a laminated structure of a transmissive material, such as Al/ITO, and a metallic material having high reflectance.

Further, the cathode 537 are arranged so as to cover the bank layer 534 and an exposed surface of the organic EL layer (the light-emitting layer 536), and serves as a common electrode to the respective pixels. In this case, in addition to the above-mentioned cathode structure, a film obtained by laminating a metallic material having a low work function, such as Ca, Mg, Ba, or Sr, and another metallic material serving as a protective electrode, such as Al, Ag, or Au, with a thickness of 50 nm or less can be used as the cathode.

In the element substrate 530, a circuit element portion 531 and an interlayer insulating film 532 are sequentially formed on a base substrate 530A made of glass or resin, and the anodes 533 are arranged in a matrix, corresponding to the respective pixels, on the interlayer insulating film 532. The circuit element portion 531 is provided with various wiring lines, such as scanning lines and signal lines, storage capacitors (not shown) for holding image signals, TFTs 531a, serving as pixel switching elements, etc. Since this embodiment adopts the top emission structure, the base substrate 530A is not necessarily made of a transparent material. Therefore, a transflective or opaque substrate, such as a semiconductor substrate, other than the transparent substrate can be used as the base substrate 530A.

The organic EL layer is formed by laminating the hole injecting/transporting layer 535 and the white light emitting layer 536 containing a white light emitting material in this order from the lower layer side (the pixel electrode side).

The hole injecting/transporting layer 535 is preferably made of a polymer material, such as polythiophene, polystyrene sulfonic acid, polypyrrole, polyaniline, or a derivative thereof. As materials (light emitting material) forming the white light emitting layer 536, a polymer light emitting material or low-molecular organic light emitting pigment, that is, various light emitting materials, such as a fluorescent material or a phosphorescent materials, can be used. It is particularly preferable that a conjugate-system polymer, which is a light emitting material, include an arylenevinylene or polyfluorene structure.

In this embodiment, as described above, the bank layer 534 having the openings formed corresponding to the organic EL layer forming regions is provided. Therefore, this embodiment has a structure suitable for forming the hole injecting/transporting layer 535 and the white light emitting layer 536 by an inkjet method (a droplet discharging method). Therefore, it is preferable to use a polymer material suitable for the droplet discharging method as the light emitting material. More specifically, for example, a material obtained by mixing polydioctylfluorene (PFO) with MEH-PPV at the ratio of 9 to 1 can be used as the light emitting material. In addition, in this embodiment, the organic EL layer has a two-layered structure of the hole injecting/transporting layer and the light emitting layer. However, an electron transporting layer and an electron injecting layer may be formed on the white light emitting layer 536.

The substrates having the above-mentioned structure are sealed by a sealing material 538. Preferably, the sealing material 538 has a gas barrier property, and can be made of, for example, a silicon oxide, such as $SiO_2$, a silicon nitride, such as SiN, or a silicon oxynitride, such as $SiO_xN_y$. In addition, it is more preferable to laminate a resin layer made of, for example, acryl, polyester, or epoxy on the inorganic oxide layer. Further, a protective layer may be provided between the cathode 537 and the sealing material 538, if necessary.

In the organic EL display device 500 of this embodiment, color converting layers (color converting members) 539R, 539G, and 539B are provided in regions overlapping the pixel electrodes 533 in plan view on the sealing material 538. These color converting layers 539R, 539G, and 539B can have the same structure as the color converting layers 230R and 230G according to the second embodiment. That is, the color converting layers can be formed of a resin film made of a resin material containing a fluorescent pigment or of a half mirror made of an inorganic material.

Meanwhile, in the counter substrate 540, a color filter 541 is provided on a transmissive base substrate 540A made of, for example, glass or resin. R, G, and B colored portions 542R, 542G, and 542B are arranged in a matrix in regions partitioned by a bank layer 521 in the color filter 541. Openings (colored portion forming regions) of the bank layer 521 are provided to overlap openings of a bank layer 534 formed on the element substrate 530 in plan view. Therefore, the colored portions 542R, 542G, and 542B are arranged to overlap the color converting layers 539R, 539G, and 539B and the organic EL layer of the element substrate 530 in plan view, respectively.

In the organic EL display device of this embodiment, the color converting layers 539R, 539G, and 539B each have a function of converting some of light components passing through themselves into a colored light having a predetermined wavelength, and thus can supply light components having the optimal spectral characteristics to the corresponding colored portions 542R, 542G, and 542B, respectively. That is, the color converting layer 539B functions to raise emission intensity around a peak wavelength of the transmittance curve of the colored portion 542B, and the color converting layer 539G functions to raise emission intensity around a peak wavelength of the transmittance curve of the colored portion 542G. For example, when the color filter 541 has the wavelength selection characteristic shown in FIG. 4, the color converting layer 539B is constructed to convert a portion of white light emitted from the organic EL layer into a light component around a wavelength of 450 nm where the maximum transmittance is obtained in the colored portion 542B, and the color converting layer 539G is constructed to convert a portion of the white light into a light component around a wavelength of 530 nm.

As such, in the organic EL display device 500 of this embodiment, white light emitted from the organic EL elements, which is light emitting elements, is converted into a predetermined colored light by the color converting layers 539R, 539G, and 539B, and is then incident on the colored portions 542R, 542G, and 542B, thereby forming display light. Therefore, it is possible to improve the color purity of colored light emitted from the respective colored portions, compared to a structure in which the color converting layer is not provided, and thus to achieve high-quality display.

Further, in this embodiment, the light emitting layer 536 emitting white light is used. However, a light emitting layer emitting blue light, violet light, or ultraviolet light may be used as the light emitting layer 536. When any type of light emitting layer is used, emission light therefrom is color-converted by the color converting layer provided in each pixel. Therefore, it is possible to make light having the spectral characteristic suitable for each color incident on each colored portion, and thus to achieve an organic EL display device capable of displaying high-quality images.

Electronic Apparatus

Figure 13A:
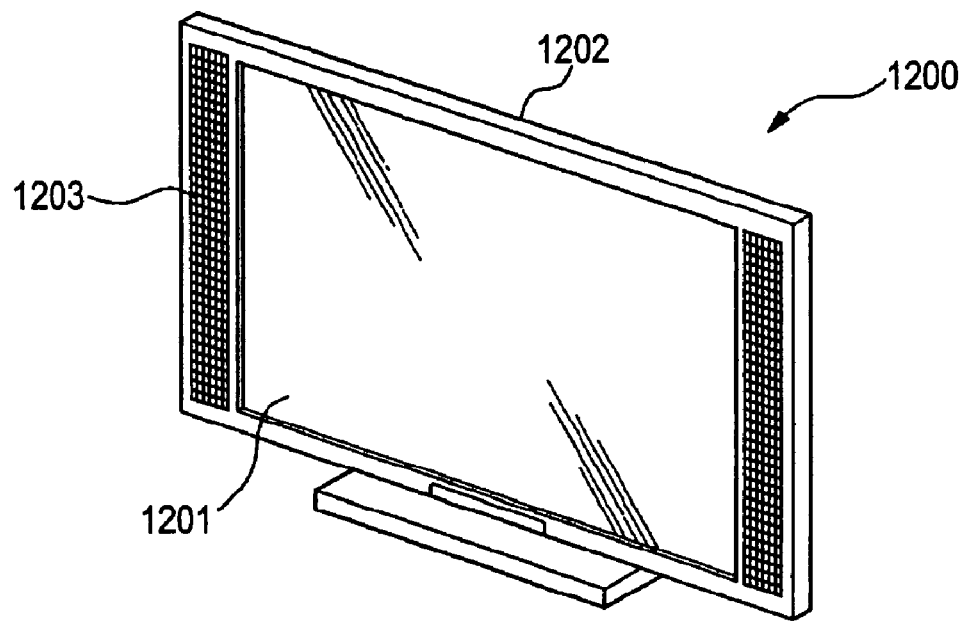
FIG. 13A is a perspective view illustrating the structure of an electronic apparatus according to the invention.
Figure 13B:
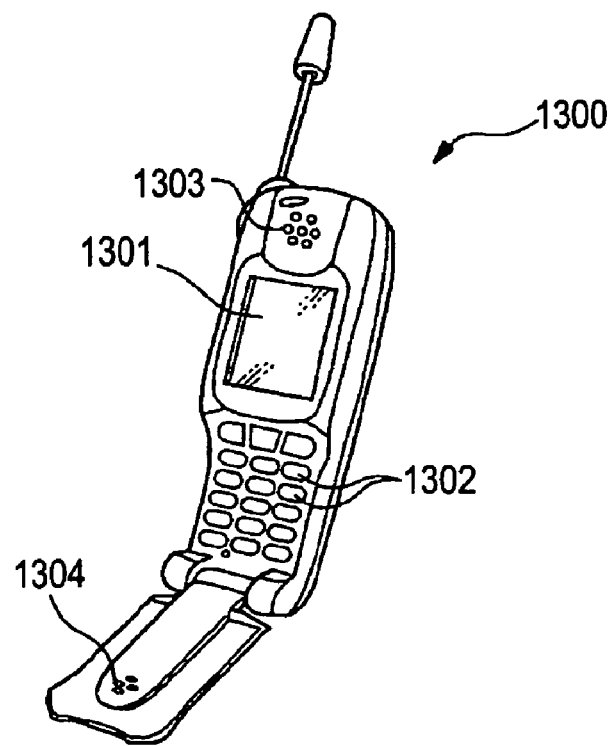
FIG. 13B is a perspective view illustrating the structure of another electronic apparatus according to the invention.

FIGS. 13A and 13B are perspective views illustrating the structure of electronic apparatuses according to the invention.

An image monitor 1200 shown in FIG. 13A includes a display unit 1201 having the liquid crystal display device or the organic EL display device according to the above-mentioned embodiments, a case 1202, and a speaker 1203. Since the image monitor 1200 includes the liquid crystal display device or the organic EL display device, it can display high-quality images.

A cellular phone 1300 shown in FIG. 13B includes a display unit 1301 having the liquid crystal display device or the organic EL display device according to the above-mentioned embodiments, an operating portion 1302, a receiver unit 1303, and a transmitter unit 1304. According to the cellular phone 1300, the liquid crystal display device or the organic EL display device can display high-quality images.

Further, the electro-optical device can be applied to an electronic book, a personal computer, a digital still camera, a view-finder-type or monitor-direct-view-type videotape recorder, a car navigation system, a pager, an electronic organizer, an electronic calculator, a word processor, a workstation, a television phone, a POS terminal, and apparatuses equipped with touch panels, in addition to the image monitor. Therefore, these electronic apparatuses can also display high-quality images.

What is claimed is:

1. An electro-optical device comprising:
   an element substrate;
   a pixel electrode disposed over the element substrate;
   a counter electrode opposite to the pixel electrode, the counter electrode having light transmissivity;
   an organic electro-luminescent (EL) layer disposed between the pixel electrode and the counter electrode, the organic EL layer having at least a light-emitting layer;
   a sealing material disposed over the counter electrode;
   a color converting layer which is a substantially flat sheet layer over the sealing material, the color converting layer overlapping the pixel electrode in plan view;
   a counter substrate opposite to the element substrate, the color converting layer being disposed between the counter substrate and the element substrate;
   a color filter disposed over the counter substrate, the color filter including a colored portion that selectively transmits a light that is within a certain wavelength range; and
   an adhesive layer bonding the element substrate and the counter substrate such that the color converting layer and the colored portion are opposite to each other;
   the colored portion overlapping the organic EL layer and the color converting layer in plan view,
   the color converting layer converting a light emitted by the organic EL layer into light having a wavelength near the certain wavelength range selectively transmitted by the colored portion.

2. The electro-optical device according to claim 1, further comprising:
   another pixel electrode adjacent to the pixel electrode;
   another organic EL layer adjacent to the organic EL layer; and
   a bank layer that partitions the pixel electrode from the another pixel and that partitions the organic EL layer from the another organic EL layer.

3. The electro-optical device according to claim 1, the sealing material having a gas barrier property.

4. The electro-optical device according to claim 1, the colored portion of the color filter being a red colored portion that transmits red colored light, the color filter further including a green colored portion that transmits green colored light and a blue colored portion that transmits blue colored light.

5. The electro-optical device according to claim 1, the color converting layer being a resin film containing a fluorescent pigment.

6. The electro-optical device according to claim 1, the color converting layer being a half mirror made of an inorganic material.

7. An electronic device including the electro-optical device according to claim 1.

8. The electro-optical device according to claim 1, further comprising:
   a first bank layer, the pixel electrode being partitioned by the first bank layer; and
   a second bank layer, the colored portion being partitioned by the second bank layer.

* * * * *